United States Patent [19]

Sheets, Jr.

[11] 3,977,600
[45] Aug. 31, 1976

[54] TEMPERATURE RESPONSIVE FLUID FLOW REGULATOR

[75] Inventor: Charles Elmer Sheets, Jr., Racine, Wis.

[73] Assignee: J. I. Case Company, Racine, Wis.

[22] Filed: Nov. 6, 1975

[21] Appl. No.: 629,481

[52] U.S. Cl. ............................ 236/93 R; 236/101 R
[51] Int. Cl.² ........................................ G05D 23/02
[58] Field of Search ............ 236/93 R, 93 B, 101 R; 62/511; 138/45

[56] References Cited
UNITED STATES PATENTS

| | | | |
|---|---|---|---|
| 2,241,086 | 5/1941 | Gould | 236/101 R X |
| 2,930,594 | 3/1960 | MacCracken | 236/93 R X |
| 3,095,175 | 6/1963 | Iketani | 138/45 X |
| 3,378,063 | 4/1968 | Mefferd | 236/93 R X |
| 3,904,111 | 9/1975 | Petersson | 236/101 R X |

Primary Examiner—William E. Wayner
Assistant Examiner—William E. Tapolcai, Jr.
Attorney, Agent, or Firm—Arthur J. Hansmann

[57] ABSTRACT

A temperature responsive fluid flow regulator having a body piece with fluid inlet and outlet passageways and an intermediate fluid chamber. An elastomeric member is disposed within the body piece and is confined therein and has an orifice aligned with the outlet. The member is responsive to temperature changes, and a restraining member confines it such that an increase in temperature causes a reduction in the size of the orifice to thus control the flow of fluid through the regulator. An adjustable needle is also utilized for further controlling the flow through the regulator.

6 Claims, 4 Drawing Figures

U.S. Patent    Aug. 31, 1976    3,977,600
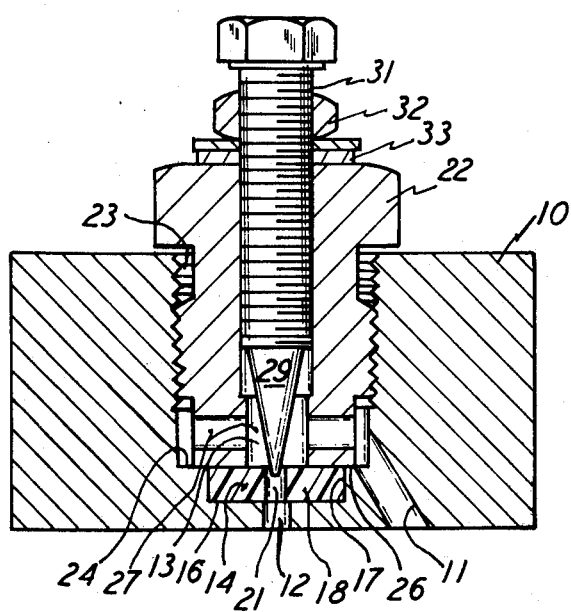
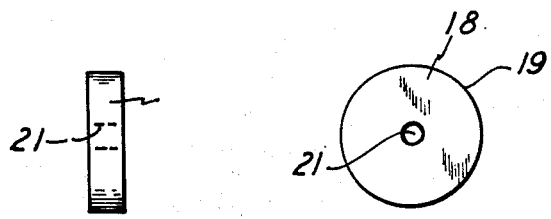
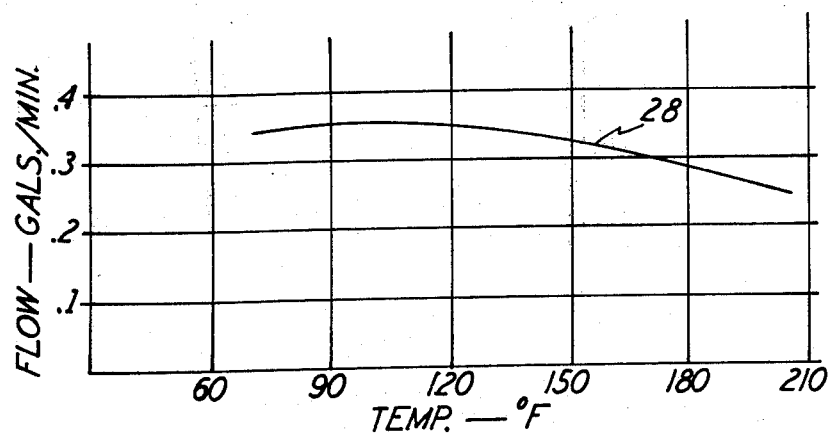

TEMPERATURE RESPONSIVE FLUID FLOW REGULATOR

This invention relates to a temperature responsive fluid flow regulator, and, more particularly, it relates to a fluid flow regulator which automatically adjusts itself to the temperature of the fluid flowing therethrough to thereby regulate the quantity of flow, such as reducing the quantity of flow in response to an increase in temperature of the fluid.

BACKGROUND OF THE INVENTION

Fluid flow regulators which respond to temperature changes are already known in the prior art. These regulators may be in the form of a temperature responsive member which expands when subjected to an increase in temperature, to thereby reduce the flow of fluid through the member. One such example of an isolated temperature responsive member is shown in U.S. Pat. No. 3,904,111.

The present invention provides an arrangement of an entire regulator which has a body piece confining a temperature responsive member with an orifice, and the member is confined within the body piece so that the orifice is reduced in size when the member is subjected to an increase in temperature. With this arrangement, the regulator of this invention can be utilized for either retaining a constant flow of fluid through the regulator, or it can be utilized for reducing the flow through the regulator, with both functions occurring when the temperature of the fluid is increased. That is, in considering a hydraulic fluid, or one which has a lower viscosity produced by an increase in its temperature, in certain instances it is desirable to have a continuous flow through the regulator when the temperature of the fluid is increased. These particular instances, as mentioned, are desirable in various industrial applications where it is desirable to control the flow of fluid.

Accordingly, it is a primary object of this invention to accomplish the aforementioned functions and to do so with a reliable and yet inexpensive and readily provided and readily serviced type of regulator and one which is not complicated and one which consistently repeats its performance of governing the desired quantity of flow in response to specific temperature changes of the fluid flowing therethrough.

Further, it is an object and advantage of this invention to provide a regulator with the aforementioned characteristics and to have the parts of the regulator, and particularly the temperature responsive member, compatible with various fluids which can be flowing through the regulator such that the member will respond to temperature changes and will not deteriorate and alter its characteristic of changing its orifice according to specific temperature changes to which it is subjected.

Other objects and advantages will become apparent upon reading the following description in light of the accompanying drawings.

BRIEF DESCRIPTION OF THE DRAWINGS

FIG. 1 is a sectional view through an embodiment of a regulator of this invention.

FIGS. 2 and 3 are front and side elevational views, respectively, of the temperature responsive member shown in FIG. 1.

FIG. 4 is a graph indicating the flow of fluid through the regulator of FIG. 1 and according to the temperature changes shown on the graph.

DETAILED DESCRIPTION OF THE PREFERRED EMBODIMENT

FIG. 1 shows the regulator with a body piece 10 and having a fluid inlet passageway 11 and a fluid outlet passageway 12 and an intermediate chamber 13 which is in fluid-flow communication with the inlet 11 and outlet 12 so that fluid can flow through the piece 10. The body piece 10 has a pocket 14 defined therein by an end wall 16 and a circular side wall 17, and the pocket 14 is actually exposed to the intermediate chamber 13, as shown, and the body piece outlet 12 extends through the confining wall 16. An elastomeric member 18, made of a plastic material such as the material VITON, a trademarked plastic material, is snugly disposed in the pocket 14 and is of a circular shape, as best shown in FIG. 2, to have a circular wall 19 extending in snug and fluid-tight contact with the body piece wall 17. Also, the elastomeric member 18 is of a thickness which is the same as the depth of the pocket 14 and that would be the length of the wall 17, and thus the elastomeric member 18 completely fills the pocket 14 and is fluid-tight with the pocket walls 16 and 17. The elastomeric member 18 has a central and circularly-shaped orifice 21 extending therethrough, and the orifice 21 is aligned with and thus is in fluid-flow communication with the body piece outlet 12 so that flow can go from the body piece chamber 13 and past the elastomeric member 18 and through the body piece outlet 12.

A restraining member 22 is threadedly disposed in the body piece 10 by threading into an opening 23 extending in the body piece 10 and to the chamber 13. The piece 22 is thus disposed in a set position in the body piece 10, and it extends down to the elastomeric member 18 in a manner hereinafter described. The body piece 10 is shown to have an annularly-shaped shelf 24 which surrounds and is contiguous with the pocket 14 and is endless in the body piece 10, and the restraining member 22 has an end wall 26 which is also circularly shaped and is planar and extends continuously along the shelf 24 and is in contact therewith and the end wall 26 is of an overall size to fully span the pocket 14 and to be in confining abutment with the upper surface 27 or the elastomeric member 18. That is, threading of the restraining member 22 into the body 10 is limited by the wall 26 abutting the shelf 24, and thus compression by the restraining member 22 on the elastomeric member 18 is accordingly limited. With this arrangement, the elastomeric member 18 is fully confined in the pocket 14, and part of the confinement is provided by the restraining member end wall 26, as shown and described. However, the elastomeric member 18 is free to expand in response to an increase in the temperature in the fluid flowing through the unit, and the elastomeric member 18 is of a characteristic which will cause it to expand in response to a temperature increase as mentioned. Accordingly, when the temperature of the fluid increases, the only expansion possible with regard to the elastomeric member 18 is to have the elastomeric member 18 expand in a direction toward its center and to thereby reduce its orifice 21, and thus there is a regulating or a reduction of the flow of fluid past the elastomeric member 18. Further, when the temperature of the fluid is again reduced, then the elastomeric member 18 will again respond to the change in temperature, but this time it will contract and thereby extend or expand the size of the orifice 21 and thus permit a greater quantity of fluid to flow past the elastomeric member 18. In this manner, the regulator of this invention will give an automatic regulation to the quantity of fluid flowing therethrough, and that regulation is in accordance with the increase and the decrease of the temperature of the fluid flowing therethrough, as mentioned.

Of course it will also be noticed that the member 22 has fluid passageways 27 extending therein to flow communicate the chamber 13 with the orifice 21. Accordingly, the elastomeric member 18 is of a physical characteristic that it is not compressable, and the arrangement of the depth of the pocket 14 and the thickness of the member 18 are such that the member 18 is actually not compressed by the restraining member 22, but the member 18 is of a physical characteristic that it deforms, that is it expands and contracts, according to temperature changes, as mentioned. Still further, the elastomeric member 18 is of a physical characteristic that it is nondeteriorating in the environment of commercial fluids, such as hydraulic fluids and oils, and it is therefore inert to those types of commercial fluids, but yet it is capable of expanding and contracting in response to temperature changes in the variations of at least one hundred degrees Fahrenheit.

FIG. 4 therefore shows the flow of fluid, in gallons per minute, charted according to the temperature in degrees Fahrenheit, and it will therefore be seen that when the temperature rises the quantity of flow through the regulator, as established by the contraction of the orifice 21, is actually reduced. Of course the size of the body of the elastomeric member 18 which is an annularly-shaped member having the central opening or orifice 21 can be such that the flow of fluid through the orifice 21 is of a uniform quantity when the temperature of the fluid increases and thus the viscosity of the fluid would decrease and normally create greater flow. That is, the elastomeric member 18 may be so dimensioned or of such a size that it would either cause a reduction in the flow of fluid or it will retain the flow of fluid at the same rate even though, in both instances, the temperature of the fluid has substantially increased, such as shown in the graph in FIG. 4. In actuality, it has been found that the thickness of the elastomeric member 18, as seen in its side view in FIG. 3, is of little effect with regard to the altering of the flow therethrough, as compared to the overall diameter of the elastomeric member 18, as seen in FIG. 2. In the final analysis, the arrangement is such that the elastomeric member 18 has a coefficient of expansion which is greater than the coefficient of expansion of the surrounding parts which are normally made of metal rather than plastic, and thus the aforementioned regulation is achieved. It has been found that VITON is a desirable elastomeric material, but any material which has a repeatable thermal coefficient of expansion is acceptable, and such material will give the graph line designated 28 in FIG. 4, or a comparable line, as mentioned above.

Finally, there is a needle 29 which has a threaded shank 31 threadedly extending through the restraining member 22, and a lock nut 32 and a fluid seal 33 surround the shank 31, as shown. The needle 29 aligns with the orifice 21 to thus adjustably increase and decrease the passageway at the entrance of the orifice 21 and to accordingly increase or decrease the quantity of fluid flowing through the orifice 21, in a conventional arrangement of a needle valve with an aligned orifice. With this arrangement, depending upon the relative sizes and the setting of the needle 29 as compared to the orifice 21, and depending upon the relative size of the elastomeric member 18 and the change in temperature of the fluid flowing therepast, the quantity of flow can be automatically regulated to either reduce or be retained at the same rate in response to an increase in temperature. There is therefore a combination of the arrangement of the elastomeric member 18 and the adjustable needle 29, and the characteristics mentioned above, to achieve the desirable flow characteristics, such as those also mentioned above. Of course the desirable flow characteristics are achieved by the automatic and self change in size of the elastomeric member 18 in response to temperature changes, but the initial setting of the needle 29 will effect the consequent rate of flow through the expanding or contracting orifice 21. That is, the control of the rate of flow is automatic in the regulator, and the needle 29 need not be adjusted after it is once set.

What is claimed is:

1. A temperature responsive fluid flow regulator comprising a body piece having a fluid flow inlet and a fluid flow outlet and a fluid chamber in flow communication therebetween, said body piece having confining walls defining a pocket with one open side and with one of said walls having said fluid flow outlet passing therethrough, a temperature responsive expandable and contractable elastomeric member disposed in said pocket and tightly confined by said walls and having an orifice extending therethrough in fluid flow communication with said fluid flow outlet and said fluid chamber for interrupting flow between the latter two, and a restraining member extending across said pocket open face and disposed in contact with said elastomeric member and being fluid tight therewith and releasably secured in said body piece for urging said elastomeric member fluid tightly against said walls and with said restraining member having a fluid passageway in fluid flow communication with said orifice and said chamber, and with said restraining member and said elastomeric member disposed and adapted to have said elastomeric member confined in said pocket to expand to reduce the size of said orifice in response to an increase in the temperature of the fluid and thereby regulate the quantity of fluid flowing through said regulator, according to the temperature of the fluid.

2. The temperature responsive fluid flow regulator as claimed in claim 1, wherein said elastomeric member is annularly shaped with flat faces at the axially opposite ends thereof.

3. The temperature responsive fluid flow regulator as claimed in claim 1, wherein the thickness of said elastomeric member is the same as the depth of said pocket, and with said body piece having a shelf contiguous to and surrounding said pocket, and said restraining member having an end wall disposed on said shelf and of a size to completely span said pocket for confining said elastomeric member but with freedom to allow said elastomeric member to expand inwardly in response to an increase in its temperature.

4. The temperature responsive fluid flow regulator as claimed in claim 1, wherein said elastomeric member is annularly shaped with flat faces at the axially opposite ends thereof and with the thickness of said elastomeric member being the same as the depth of said pocket, and with said body piece having a shelf contiguous to and surrounding said pocket, and said restraining member having an end wall disposed on said shelf and of a size to completely span said pocket for confining said elastomeric member but with freedom to allow said elastomeric member to expand inwardly in response to an increase in its temperature.

5. The temperature responsive fluid flow regulator as claimed in claim 1, including an adjustable needle threadedly disposed in said restraining member and aligned with said orifice for altering the fluid flow area of said orifice.

6. The temperature responsive fluid flow regulator as claimed in claim 1, wherein said elastomeric member is made of the material trademarked VITON.

* * * * *